United States Patent
Joo et al.

(10) Patent No.: US 11,991,522 B2
(45) Date of Patent: May 21, 2024

(54) APPARATUS AND METHOD FOR TRAFFIC SECURITY PROCESSING IN 5G MOBILE EDGE COMPUTING SLICING SERVICE

(71) Applicant: WINS Co., Ltd., Seongnam-si (KR)

(72) Inventors: Eun Young Joo, Seongnam-si (KR); Yong Sig Jin, Yongin-si (KR)

(73) Assignee: WINS Co., Ltd., Seongnam-si (KR)

( * ) Notice: Subject to any disclaimer, the term of this patent is extended or adjusted under 35 U.S.C. 154(b) by 362 days.

(21) Appl. No.: 17/561,868

(22) Filed: Dec. 24, 2021

(65) Prior Publication Data

US 2022/0295283 A1     Sep. 15, 2022

(51) Int. Cl.
*H04W 12/106* (2021.01)
*H04W 12/121* (2021.01)
*H04W 28/06* (2009.01)

(52) U.S. Cl.
CPC ....... *H04W 12/106* (2021.01); *H04W 12/121* (2021.01); *H04W 28/065* (2013.01)

(58) Field of Classification Search
CPC ............. H04W 12/106; H04W 12/088; H04W 12/121; H04W 28/065; H04L 63/1425; H04L 63/0236
See application file for complete search history.

(56) References Cited

U.S. PATENT DOCUMENTS

| | | | | |
|---|---|---|---|---|
| 2019/0026094 A1* | 1/2019 | Stammers | ............... | H04L 41/14 |
| 2020/0106812 A1* | 4/2020 | Verma | ................. | H04W 12/088 |
| 2020/0195495 A1* | 6/2020 | Parker | ..................... | H04L 41/40 |
| 2022/0124486 A1* | 4/2022 | Andrews | ............... | H04W 12/71 |
| 2023/0269589 A1* | 8/2023 | Baskaran | .............. | H04W 12/03 |
| | | | | 726/6 |

FOREIGN PATENT DOCUMENTS

| | | | | |
|---|---|---|---|---|
| CN | 110392370 A | | 10/2019 | |
| JP | 2007533207 A | * | 11/2007 | ............... H04L 9/40 |
| KR | 20060126557 A | | 12/2006 | |
| KR | 20180004612 A | | 1/2018 | |
| KR | 102030764 B1 | | 10/2019 | |
| KR | 102053596 B1 | | 12/2019 | |
| WO | WO-2018076298 A1 | * | 5/2018 | ............ H04W 28/18 |

* cited by examiner

*Primary Examiner* — Lynn D Feild
*Assistant Examiner* — Abdullah Almamun
(74) *Attorney, Agent, or Firm* — BROADVIEW IP LAW, PC

(57) ABSTRACT

An apparatus for traffic security processing in a slicing service of mobile edge computing according to an embodiment of the present invention includes: a plurality of security modules for analyzing a received packet to respectively execute security functions suitable for slicing security of mobile edge computing; a controller for managing a slicing security module list in the mobile edge computing; and a main security module for analyzing a received packet on the basis of the slicing security module list to determine a security function to be executed and priority of the security function to be executed, wherein the controller transmits the received packet to at least one corresponding security module among the plurality of security modules according to the priority of the security function to be executed, which is determined by the main security module.

16 Claims, 6 Drawing Sheets

APPARATUS AND METHOD FOR TRAFFIC SECURITY PROCESSING IN 5G MOBILE EDGE COMPUTING SLICING SERVICE

CROSS-REFERENCE TO RELATED APPLICATION(S)

This application is based on and claims priority under 35 U.S.C. 119 to Korean Patent Application No. 10-2020-0144410, filed on Nov. 2, 2020, in the Korean Intellectual Property Office, the disclosure of which is herein incorporated by reference in its entirety.

BACKGROUND OF THE INVENTION

1. Field of the Invention

The present invention relates to an apparatus and a method for traffic security processing in a slicing service of mobile edge computing.

2. Description of the Prior Art

In order to perform ultra-low latency, ultra-high speed, and ultra-access processing, which are the characteristics of 5G mobile, and provide faster services to local subscribers, an ultra-access network using mobile edge computing (MEC) technology is being constructed.

Since the security of the MEC service is becoming increasingly important, a faster security processing method for ultra-low latency and ultra-high speed processing is required.

MEC network slicing is a technology for processing traffic faster by separating traffic of services such as smart factories, CCTVs, autonomous vehicles, general users, and games as shown in FIG. 1.

It is a concept in which traffic is divided according to respective services, priority is separated, and traffic of a quality-sensitive service is preferentially processed, and a less-sensitive service is processed later by lowering the priority of quality.

The purpose of MEC network slicing is to strengthen the security function by operating the MEC security module functions to conform to the respective services.

However, these security module functions are performed through several stages in a virtualized environment, which inevitably causes delays in the mobile network.

When passing through security modules such as a firewall, IPS, DDOS, a smart factory analysis system, and the like in sequence, a delay occurs as much as the analysis time of the security module functions according to the analysis time of the respective security modules.

In the security technology in the MEC, in order to process a packet in several stages, security functions are sequentially executed using a service routing technology using a virtual switch (vSwitch) or the like. As the packet passes through several security modules, the latency inevitably and gradually increases, and it is difficult to perform associated processing.

As shown in FIG. 2, if the security technology is comprised of several security modules 200, 202, 204, 206, and 208 for respective services in the MEC, the security function of each security module should be executed by changing the flow of a packet.

For example, after processing the packet in the security module 200, a changing and routing modification operation must be continuously performed by changing a destination IP or VLAN ID through a routing operation such that the packet reaches the security module 202, and security operations must be performed through multiple HoPs through a changing operation such that the packet reaches the security module 208.

In order to implement service chaining technology or the like in the prior art, only explicit separation is possible to indicate that respective packets have the same tunnel ID through a header such as VLAN and VXLAN ID, but it is difficult to separately process the respective security functions, and it is impossible to distribute the packets and to determine simultaneous role thereof.

In addition, each security module has a burden of examining all packets in order to recognize the security characteristics of slicing traffic. This analysis results in repeated packet analysis and increases packet processing latency.

As described above, the prior art has a structure in which the packet must be monitored and processed for respective security applications, which makes much of security, but provides a passive security form such as a functional minimization and postprocess form due to an increase in the latency.

SUMMARY OF THE INVENTION

An aspect of the present invention is to provide an apparatus and a method for traffic security processing in a slicing service of mobile edge computing, which can ensure a security engine sequence between analysis priority and security applications by applying a service chaining model between security applications, thereby improving security processing speed.

In addition, another aspect of the present invention is to provide an apparatus and a method for traffic security processing in a slicing service of mobile edge computing, which can minimize the security detection performance and latency in terms of a slicing service of mobile edge computing (MEC).

In addition, another aspect of the present invention is to provide an apparatus and a method for traffic security processing in a slicing service of mobile edge computing, which can provide a processing method for the priority detection packet between slicing service security applications in the MEC, thereby analyzing related security vulnerabilities faster and minimizing the analysis latency.

In view of the foregoing, an apparatus for traffic security processing in a slicing service of mobile edge computing according to an embodiment of the present invention includes: a plurality of security modules for analyzing a received packet to respectively execute security functions suitable for slicing security of mobile edge computing; a controller for managing a slicing security module list in the mobile edge computing; and a main security module for analyzing a received packet on the basis of the slicing security module list to determine a security function to be executed and priority of the security function to be executed, wherein the controller transmits the received packet to at least one corresponding security module among the plurality of security modules according to the priority of the security function to be executed, which is determined by the main security module.

In the apparatus for traffic security processing in a slicing service of mobile edge computing according to an embodiment of the present invention, the controller may receive a packet through a network interface card, generate a packet header information table and insert the same to the front of a header of the packet, and transmit the packet header information table, packet information including the packet, and the slicing security module list to the main security module, and the main security module may receive the packet header information table, the packet information including the packet, and the slicing security module list from the controller, analyze the packet to determine at least one security function to be executed and the priority of at least one security function to be executed, record the determined priority of the security function in the packet header information table, and then transmit the packet header information table to the controller.

In addition, in the apparatus for traffic security processing in a slicing service of mobile edge computing according to an embodiment of the present invention, when the packet header information table, in which the priority of the security function to be executed is recorded, is received from the main security module, the controller may transmit the packet information including the packet to at least one security module in which a subsequent security function is to be executed, among the plurality of security modules, on the basis of the received packet header information table, and at least one security module receiving the packet information including the packet from the controller, among the plurality of security modules, may execute a corresponding security function to determine whether to block or pass the packet, and then transmit a determination result thereof to the controller.

In addition, the apparatus for traffic security processing in a slicing service of mobile edge computing according to an embodiment of the present invention may further include a message queue for storing the packet, wherein the message queue may include a packet queue, wherein the packet queue may include packet information including a drop flag, header information, and a packet, wherein the drop flag may indicate whether or not the packet is discarded, wherein the header information may be comprised of the same number of bits as the number of the plurality of security modules, wherein each bit of the header information may correspond to each of the plurality of security modules, wherein each bit of the header information may indicate whether or not a security module to execute a security function is designated, wherein if at least one security function to be executed is determined by the main security module, the main security module may indicate designation of a security module to execute the security function in a corresponding bit of the header information, and wherein at least one security module receiving the packet information from the controller, among the plurality of security modules, may execute a corresponding security function to determine whether to block or pass the packet and, if it is determined to block the packet, may indicate the state of the drop flag as being discarded.

In addition, in the apparatus for traffic security processing in a slicing service of mobile edge computing according to an embodiment of the present invention, the controller may transmit an index of the packet queue to at least one corresponding security module among the main security module and the plurality of security modules, and at least one corresponding security module among the main security module and the plurality of security modules may access data stored in the packet queue on the basis of the index of the packet queue.

In addition, in the apparatus for traffic security processing in a slicing service of mobile edge computing according to an embodiment of the present invention, if all of the security modules executing the security functions determine that the packet is normal, the controller may transmit the packet to a slicing service, and if at least one of the security modules executing the security functions determines that the packet is abnormal, the controller may discard the packet.

In addition, in the apparatus for traffic security processing in a slicing service of mobile edge computing according to an embodiment of the present invention, the security modules may include a container-based modular intrusion prevention system (IPS).

In addition, in the apparatus for traffic security processing in a slicing service of mobile edge computing according to an embodiment of the present invention, if the main security module determines that the packet is normal as a result of analyzing the received packet, the controller may transmit the packet to a slicing service.

In addition, in the apparatus for traffic security processing in a slicing service of mobile edge computing according to an embodiment of the present invention, the main security module may determine the security function to be executed and the priority of the security function to be executed on the basis of at least one piece of protocol information, session information, IP address information including a source IP address and a destination IP address, service port information including a destination port, service type information, and application layer information of the packet.

In view of the foregoing, a method for traffic security processing in a slicing service of mobile edge computing according to an embodiment of the present invention includes the operations: (A) in which a controller for managing a slicing security module list in the mobile edge computing transmits the slicing security module list and a received packet to a main security module; (B) in which the main security module analyzes the packet received from the controller to determine a security function to be executed and priority of the security function to be executed; and (C) in which the controller transmits the packet to at least one corresponding security module among the plurality of security modules according to the priority of the security function to be executed, which is determined by the main security module.

In the method for traffic security processing in a slicing service of mobile edge computing according to an embodiment of the present invention, in the operation (A), the controller may generate a packet header information table and insert the same to the front of a header of the packet, and transmit the packet header information table, packet information including the packet, and the slicing security module list to the main security module, and, in the operation (B), the main security module may receive the packet header information table, the packet information including the packet, and the slicing security module list from the controller, analyze the packet to determine at least one security function to be executed and priority of the at least one security function to be executed, record the determined priority of the security function in the packet header information table, and then transmit the packet header information table to the controller.

In addition, in the method for traffic security processing in a slicing service of mobile edge computing according to an embodiment of the present invention, in the operation (C), when the packet header information table, in which the priority of the security function to be executed is recorded, is received from the main security module, the controller may transmit the packet to at least one security module in which a subsequent security function is to be executed, among the plurality of security modules, on the basis of the received packet header information table, and the method may further include an operation (D), after the operation (c), in which at least one security module receiving the packet information including the packet from the controller, among the plurality of security modules, may execute a corresponding security function to determine whether to block or pass the packet by, and then transmit a determination result thereof to the controller.

In addition, in the method for traffic security processing in a slicing service of mobile edge computing according to an embodiment of the present invention, the controller may store the packet in a message queue, the message queue may include a packet queue, the packet queue may include packet information including a drop flag, header information, and a packet, the drop flag may indicate whether or not the packet is discarded, the header information may be comprised of the same number of bits as the number of the plurality of security modules, each bit of the header information may correspond to each of the plurality of security modules, each bit of the header information may indicate whether or not a security module to execute a security function is designated, if at least one security function to be executed is determined by the main security module, the main security module may indicate designation of a security module to execute the security function in a corresponding bit of the header information, and at least one security module receiving the packet information from the controller, among the plurality of security modules, may execute a corresponding security function to determine whether to block or pass the packet and, if it is determined to block the packet, indicate the state of the drop flag as being discarded.

In addition, in the method for traffic security processing in a slicing service of mobile edge computing according to an embodiment of the present invention, the controller may transmit an index of the packet queue to at least one corresponding security module among the main security module and the plurality of security modules, and at least one corresponding security module among the main security module and the plurality of security modules may access data stored in the packet queue on the basis of the index of the packet queue.

In addition, the method for traffic security processing in a slicing service of mobile edge computing according to an embodiment of the present invention may further include an operation (E), after the operation (D), in which if all of the security modules executing the security functions determine that the packet is normal, the controller transmits the packet to a slicing service, and in which if at least one of the security modules executing the security functions determines that the packet is abnormal, the controller discards the packet.

In addition, in the method for traffic security processing in a slicing service of mobile edge computing according to an embodiment of the present invention, the security modules may include a container-based modular intrusion prevention system (IPS).

In addition, in the method for traffic security processing in a slicing service of mobile edge computing according to an embodiment of the present invention, if the main security module determines that the packet is normal as a result of analyzing the received packet, the controller may transmit the packet to a slicing service.

In addition, in the method for traffic security processing in a slicing service of mobile edge computing according to an embodiment of the present invention, the main security module may determine the security function to be executed and the priority of the security function to be executed on the basis of at least one piece of protocol information, session information, IP address information including a source IP address and a destination IP address, service port information including a destination port, service type intonation, and application layer information of the packet.

According to an apparatus and a method for traffic security processing in a slicing service of mobile edge computing according to an embodiment of the present invention, it is possible to separate respective modularized security modules and to distribute, separate, and isolate each packet through a controller.

In addition, the respective modularized security modules can request the next analysis engine action by exchanging packet information and suspicious information through a message queue, which enables more detailed analysis.

In addition, the packet for the session and packet information determined to be normal can be directly stored in the first analysis security module, thereby minimizing latency.

In addition, it is possible to improve the security processing speed by guaranteeing the security engine sequence between the analysis priority and security applications, and it is possible to minimize the security detection performance and latency in terms of a slicing service of mobile edge computing (MEC), and a processing method for a priority detection packet between slicing service security applications in the MEC is provided, thereby analyzing related security vulnerabilities faster and minimizing analysis latency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

The objectives, specific advantages, and novel features of the present invention will become more apparent from the following detailed description and preferred embodiments taken in conjunction with the accompanying drawings.

Prior to this, the terms or words used in the present specification and claims should be construed as meaning and concept consistent with the technical idea of the present invention based on the principles in which the inventor can properly define the concept of the term in order to describe the invention in the best way, instead of being interpreted as an ordinary and dictionary meaning.

In the present specification, in adding reference numbers to the elements of each drawing, it should be noted that the same elements are given the same number even though they are shown in different drawings.

In addition, terms such as "first", "second", "one surface", "other side", etc. are used to distinguish one element from another element, and the element is limited to the terms.

Hereinafter, in describing the present invention, detailed descriptions of related known technologies that may unnecessarily obscure the gist of the present invention will be omitted.

Hereinafter, preferred embodiments of the present invention will be described in detail with reference to the accompanying drawings.

Figure 1:
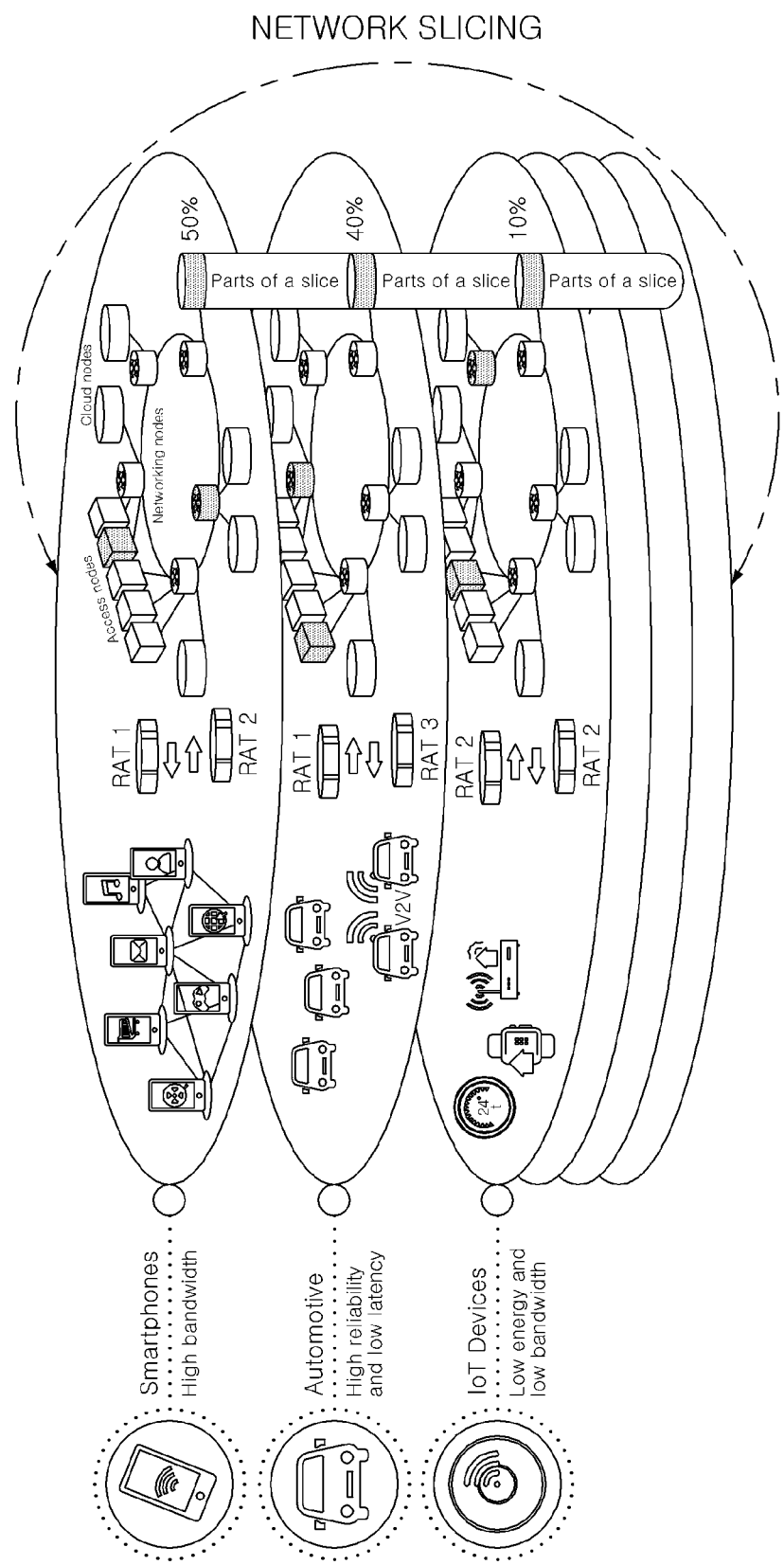
FIG. 1 is a conceptual diagram of mobile edge computing network slicing.
Figure 2:
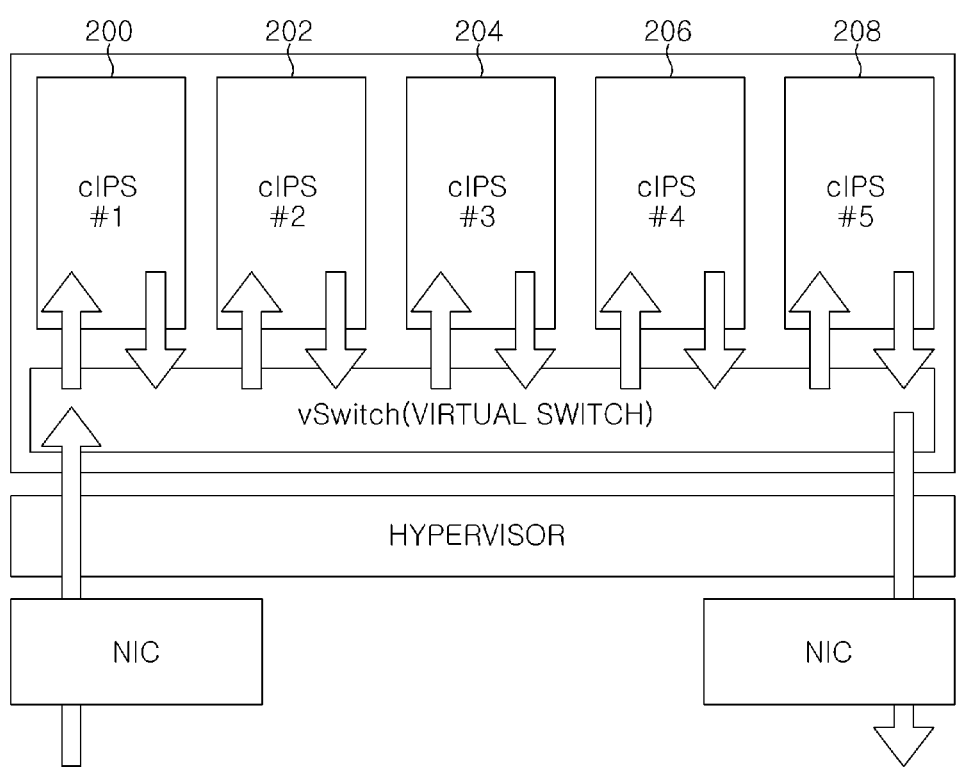
FIG. 2 is a diagram illustrating a packet processing flow of a security module for slicing inside mobile edge computing according to the prior art.
Figure 3:
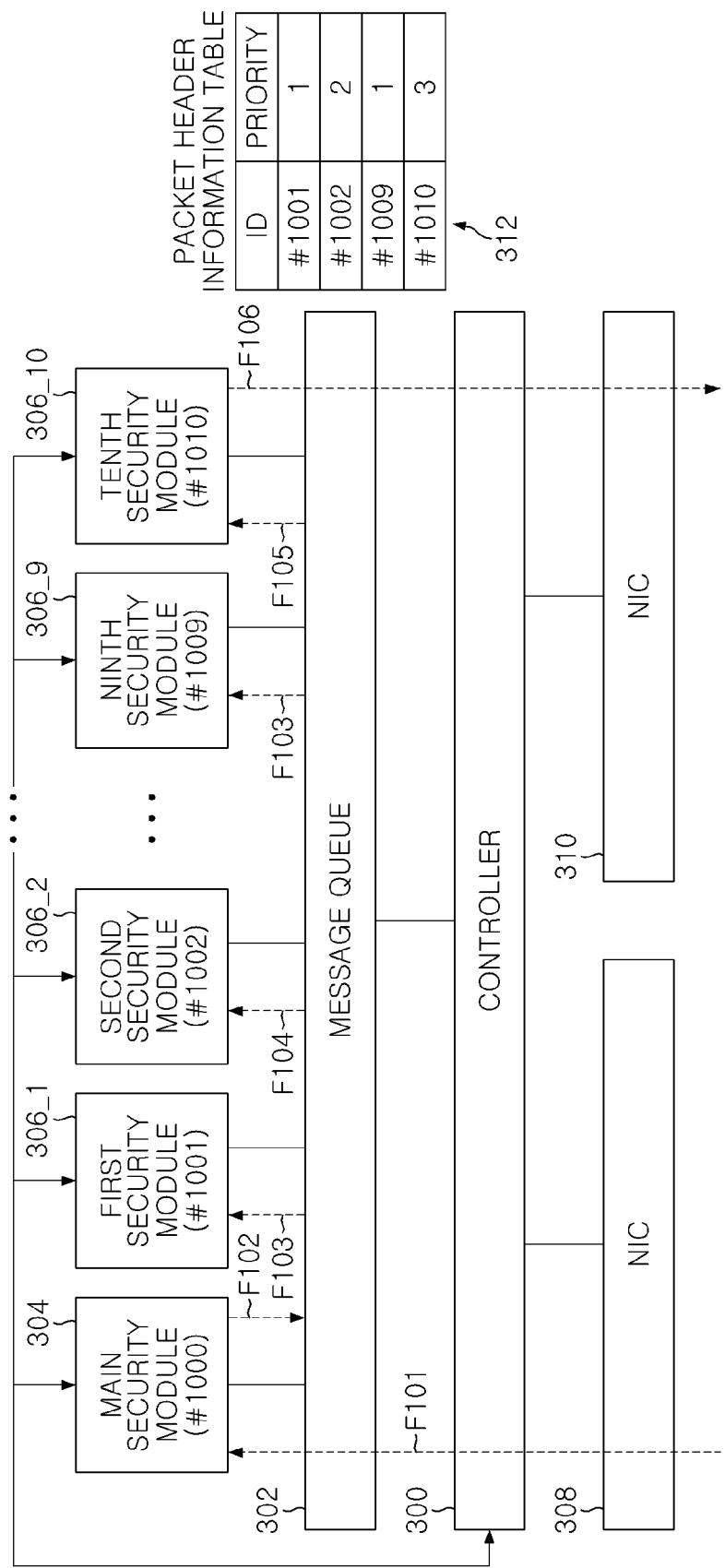
FIG. 3 is a block diagram of an apparatus for traffic security processing in a slicing service of mobile edge computing according to an embodiment of the present invention.
Figure 4:
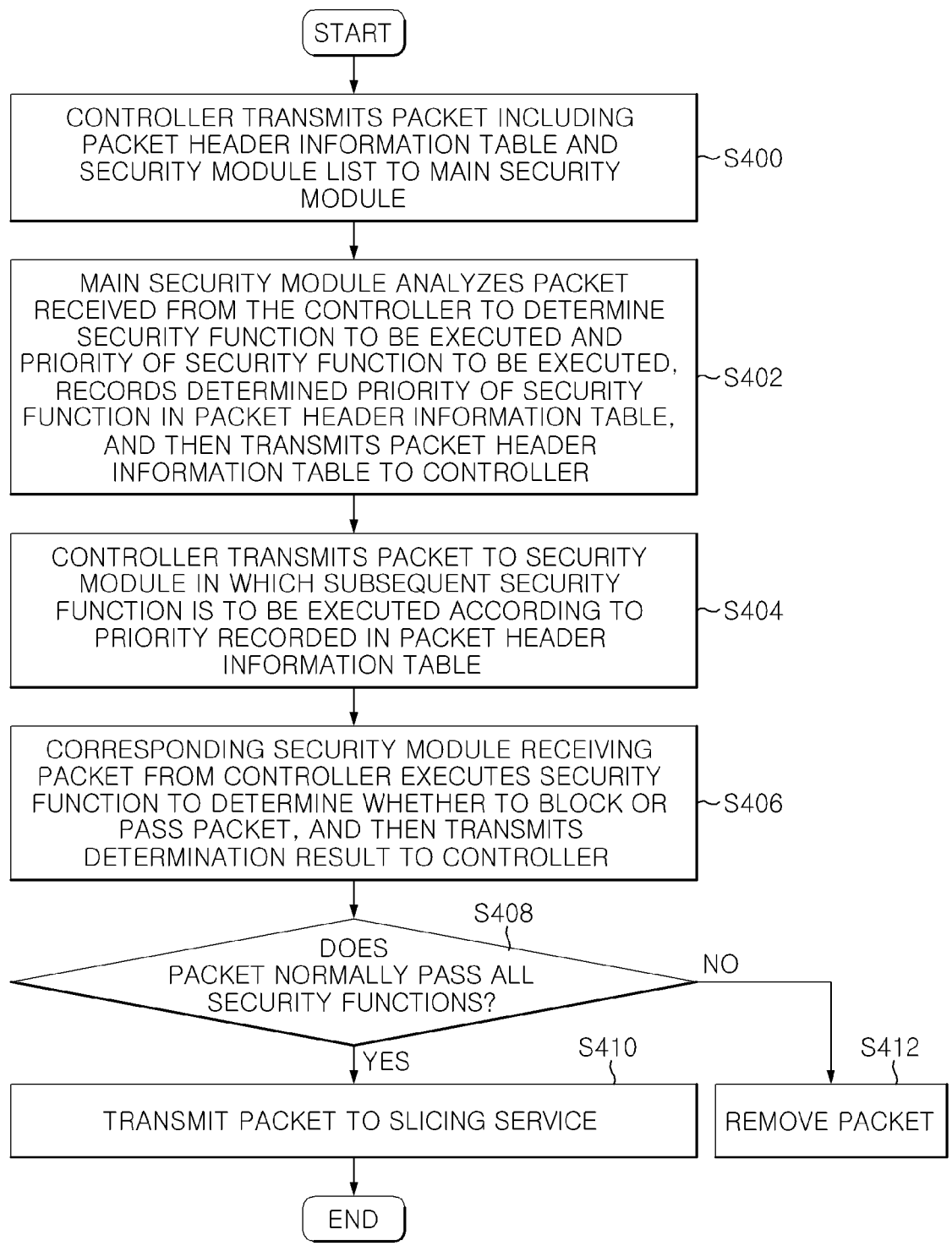
FIG. 4 is a flowchart of a method for traffic security processing in a slicing service of mobile edge computing according to an embodiment of the present invention.

FIG. 3 is a block diagram of an apparatus for traffic security processing in a slicing service of mobile edge computing according to an embodiment of the present invention, and FIG. 4 is a flowchart of a method for traffic security processing in a slicing service of mobile edge computing according to an embodiment of the present invention.

Referring to FIG. 3, an apparatus for traffic security processing in a slicing service of mobile edge computing according to an embodiment of the present invention includes first to tenth security modules 306_1 to 306_10 for analyzing a received packet in order to respectively execute security functions suitable for slicing security of mobile edge computing (MEC), a controller 300 for managing a slicing security module list in the mobile edge computing, a main security module 304 for analyzing the received packet on the basis of the slicing security module list to determine a security function to be executed and priority of the security function to be executed, and a message queue 302 for storing the packet and related information.

The main security module 304 performs session analysis, packet decoding, slicing traffic service analysis, and packet information (message header) processing.

Each of the first security module 306_1 to the tenth security module 306_10 executes each security function suitable for a network slicing configuration of the mobile edge computing (MEC).

For example, the security modules 306_1 to 306_10 include security modules related to a 5G core, which perform GTP decoding, GTP session analysis, GTP vulnerability analysis, mobile terminal vulnerability analysis, and unauthorized terminal analysis, security modules for DDoS processing, which include a flooding detection engine, a spoofed IP authentication engine, an L2 and L3 layer DDoS analysis engine, and a TCP/UDP DDoS detection engine, security modules related to smart factories, which include an OPC UA protocol analysis engine, an OPC CMD analysis engine, and an unauthorized IP analysis engine, TLS-related security modules including a QUIC protocol analysis engine, a TLS session analysis engine, an SNI analysis engine, a certificate analysis engine, and a TLS session suspicious-behavior analysis engine, cFW (convergent firewall)-related security modules including an access control list and an allow/disallow IP session processing engine, IP CCTV-related security modules including an IP CCTV-related security module, an autonomous vehicle-related security module, and a game-related security module, and the like, but the present invention is not limited thereto.

The controller 300 receives the packet, generates a packet header information table and inserts the same to the front of a header of the packet, and transmits the packet header information table, packet information including the packet, and the slicing security module list to the main security module 304.

The main security module 304 receives the packet header information table, the packet information including the packet, and the slicing security module list from the controller 300, analyzes the packet to determine at least one security function to be executed and priority of the at least one security function to be executed, records the determined at least one security function to be executed and priority of the at least one security function to be executed in the packet header information table, and then transmits the packet header information table to the controller 300.

The main security module 304 determines a security function to be executed and priority of the security function to be executed on the basis of at least one piece of protocol information, session information, IP address information including a source IP address and a destination IP address, service port information including a destination port, service type information, and application layer information of the packet.

In addition, upon receiving, from the main security module 304, the packet header information table in which the priority of the security function to be executed is recorded, the controller 300 transmits the packet to at least one security module in which a subsequent security function is to be executed, among the first to tenth security modules 306_1 to 306_10, on the basis of the received packet header information table.

In addition, at least one security module receiving the packet from the controller 300, among the first to tenth security modules 306_1 to 306_10, executes a corresponding security function to determine whether to block or pass the packet, and transmits a determination result thereof to the controller 300.

In addition, if all of the first to tenth security modules 306_1 to 306_10 executing the respective security functions determine that the packet is normal, the controller 300 transmits the packet to a slicing service, and if at least one of the first to tenth security modules 306_1 to 306_10 executing the respective security functions determines that the packet is abnormal, the controller 300 removes the packet from the message queue 302 to discard the packet.

The main security module 304 and the first to tenth security modules 306_1 to 306_10 include a container-based modular intrusion prevention system (IPS).

The operation of an apparatus for traffic security processing in a slicing service of mobile edge computing according to an embodiment of the present invention configured as described above will be described below with reference to the flowchart illustrating a method for traffic security processing in a slicing service of mobile edge computing according to an embodiment of the present invention shown in FIG. 4.

The packet information in the form of a message queue 302 is analyzed between the main security module 304 and the first to tenth security modules 306_1 to 306_10, which are modularized intrusion prevention systems (IPSs), and the controller 300, and the main security module 304 and the first to tenth security modules 306_1 to 306_10, each of which is a modularized intrusion prevention system (IPS), perform security function operations suitable for themselves according thereto.

First, in operation S400, the controller 300 for managing the slicing security module list inside the mobile edge computing stores the packet received through a network interface card 308 in the message queue 302, generates a packet header information table and inserts the same into the front of a header of the packet, and transmits the packet header information table, packet information including the packet, and the slicing security module list to the main security module 304. In FIG. 3, dotted arrows F101 to F106 indicate the flow of a packet.

In operation S402, the main security module 304 receives the packet header information table, the packet information including the packet, and the slicing security module list from the controller 300, analyzes the packet to determine at least one security function to be executed and priority of the security function to be executed, records the priority of the security function to be executed in the packet header information table, and transmits the packet header information table 312 in which the priority of the security function is recorded and information on the determined at least one security function to be executed to the controller 300.

The information on the determined at least one security function to be executed may be reflected by updating a flag of specific bits of the packet information as will be described later with reference to FIG. 6.

The main security module 304 analyzes the packet on the basis of at least one piece of protocol information, session information, IP address information including a source IP address and a destination IP address, service port information including a destination port, service type information, and application layer information of the packet, tags a security module that requires the next security threat analysis, and transmits the same to the controller 300.

For example, in an embodiment of the present invention, as indicated in the packet header information table 312, the first security module 306_1 and the ninth security module 306_9 have the first priority, the second security module 306_2 has the second priority, and the tenth security module 306_10 has the third priority.

Meanwhile, if the main security module 304 determines that the packet is normal as a result of analyzing the received packet, the main security module 304 transmits the packet to a slicing service through the controller 300. This may minimize latency.

In operation S404, upon receiving the packet header information table 310 in which the priority of the security function to be executed is recorded from the main security module 304, the controller 300 transmits the packet stored in the message queue 302 to at least one security module in which a subsequent security function is to be executed, among the first to tenth security modules 306_1 to 306_10, on the basis of the received packet header information table 310.

In an embodiment of the present invention, for example, as indicated in the packet header information table 312, the first security module 306_1 and the ninth security module 306_9 have the first priority, the second security module 306_2 has the second priority, and the tenth security module 306_10 has the third priority.

Accordingly, the controller 300 preferentially transmits the packet stored in the message queue 302 to the first security module 306_1 and the ninth security module 306_9 (F103).

In operation S406, the first security module 306_1 and the ninth security module 306_9 execute respective security functions to determine whether to block or pass the packet, and then provide a determination result thereof to the controller 300.

For example, the first security module 306_1 analyzes a suspicious attack of a GTP generation session through a GTP (GPRS tunneling protocol) security module, which is a security module related to a 5G core, and the ninth security module 306_9 analyzes a vulnerability attack of voice communication through a VoIP security module, at the same time as the first security module 306_1.

If a determination result stating that the packet is normal and thus able to pass is received from the first security module 306_1 and the ninth security module 306_9 as a result of executing the respective security functions, the controller 300 transmits the packet stored in the message queue 302 to the second security module 306_2 having priority of 2 on the basis of the packet header information table 312 (F104).

The second security module 306_2 executes its own security function to determine whether to block or pass the packet, and then provides the controller 300 with a determination result thereof.

For example, the second security module 306_2 is a vulnerability analysis security module that analyzes vulnerabilities through a combination of a vulnerability pattern and a packet.

If a determination result stating that the packet is normal and thus able to pass is received from the second security module 306_2 as a result of executing the security function, the controller 300 transmits the packet stored in the message queue 302 to the tenth security module 306_10 having priority of 3 on the basis of the packet header information table 312 (F105).

The tenth security module 306_10 executes its own security function to determine whether to block or pass the packet, and then provides the controller 300 with a determination result thereof.

If a determination result stating that the packet is normal and thus able to pass is received from the tenth security module 306_10 as a result of executing the security function, the controller 300 determines whether or not all the security functions have passed normally on the basis of the packet header information table 312 in operation S408.

In operation S408, if it is determined that all the security functions have passed normally, the controller 300 outputs the packet stored in the message queue 302 to the network interface card 310, thereby transmitting the same to the slicing service of the mobile edge computing (F106).

On the other hand, if at least one of the security modules executing the security functions determines that the packet is abnormal, the controller 300 removes the packet from the message queue 302 to discard the packet in operation S412.

As described above, the controller 300 transmits the packet to the security module to which the packet must be transmitted through the header of the packet and provides a service chain structure.

Accordingly, since the security functions are executed through some security modules, it is possible to minimize latency.

In addition, in the case where a specific protocol is required to be further analyzed, a security engine of a specific security module may be activated through a container to simultaneously analyze the packet, which enables distributed processing.

Figure 6:
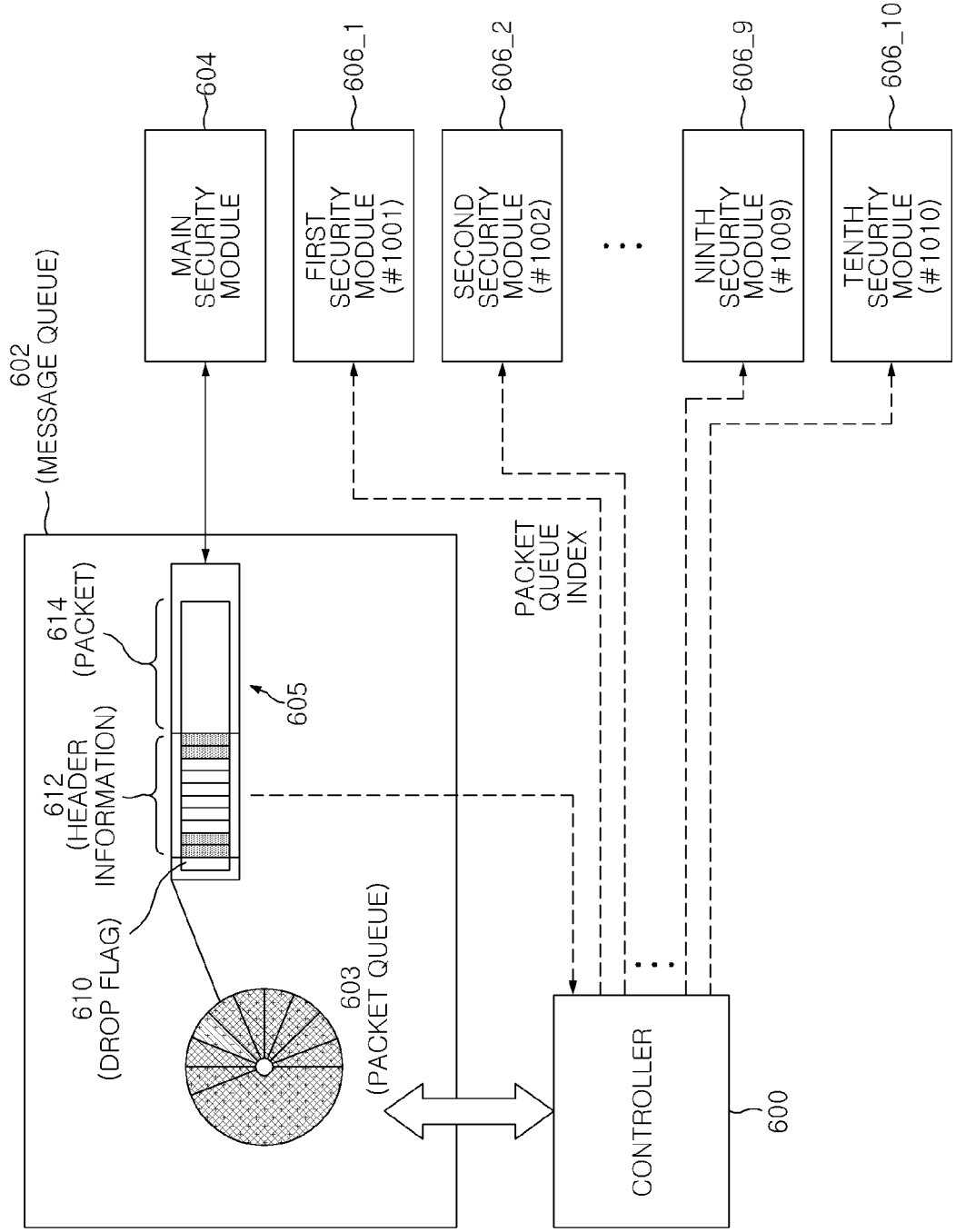
FIG. 6 is a diagram illustrating a packet transmission process between a controller and security modules.

Meanwhile, FIG. 6 is a diagram illustrating a packet transmission process between a controller 600 and security modules 604 and 606_1 to 606_10.

A message queue 602 includes a packet queue 603 including a plurality of drop flags 610, a plurality of pieces of header information 612, and a plurality of packets 614.

The drop flag 610 indicates whether or not the packet 614 is discarded, and the header information 612 is comprised of the same number of bits as the number of security modules 606_1 to 606_10. That is, the header information 612 is comprised of the same number of pieces of bit mask information as the security function list index information of the security modules 606_1 to 606_10 provided to the main security module 604 by the controller 600.

For example, in an embodiment of the present invention, since the number of security modules 606_1 to 606_10 is 10, the header information 612 is configured as 10 bits.

The bits of the header information 612 respectively correspond to the first to tenth security modules 606_1 to 606_10, and each bit of the header information 612 indicates whether or not to designate a security module to execute the security function.

If the main security module 604 analyzes at least one of protocol information, session information, IP address information including a source IP address and a destination IP address, service port information including a destination port, service type information, and application layer information of the packet 614, and if an analysis security module suitable for the slicing network is required, the main security module 604 determines at least one security function to be executed, and the main security module 604 indicates designation of the security module to execute the security function in a bit corresponding to the header information 612.

As shown in FIG. 6, in an embodiment of the present invention, if security functions are required to be executed by the first security module 606_1, the second security module 606_2, the ninth security module 606_9, and the tenth security module 606_10, the main security module 604 may configure respective flags of the first bit, the second bit, the ninth bit, and the tenth bit, which are the bits corresponding to the header information 612.

Meanwhile, the priority of at least one security function to be executed may be indicated by variables capable of configuring analysis priority of the same size as the bit mask index of the header information 612. For example, in an embodiment of the present invention, the priority may be indicated using 10 variables for each of the first to tenth security modules 606_1 to 606_10.

In addition, if the analysis order is not required, the priority is configured as the same analysis order value, and if the analysis order is required, the priority of the next security module is configured.

The controller 600 transmits a packet queue index of the packet queue 603 to at least one security module in which analysis is to be performed, among the main security module 604 and the first to tenth security modules 606_1 to 606_10, and at least one corresponding security module among the main security module 604 and the first to tenth security modules 606_1 to 606_10 accesses data stored in the packet queue 603 on the basis of the packet queue index of the packet queue 603.

In an embodiment of the present invention, the controller 600 that manages the slicing security module list inside mobile edge computing store the packet received through the network interface card (308 in FIG. 3) as a packet 614 in the packet queue 603 inside the message queue 602.

The controller 600 adds a 1-bit drop flag 610 and 10-bit header information 612 to the front of the packet 614, generates a packet header information table, and transmits a packet queue index indicating the position of the packet information 605, including the drop flag 610, the header information 612, and the packet 614, in the packet queue 603, the packet header information table, and the slicing security module list to the main security module 604.

The main security module 604 reads the packet 614 on the basis of the packet queue index received from the controller 600, analyzes the packet 614 on the basis of at least one piece of protocol information, session information, IP address information including a source IP address and a destination IP address, service port information including a destination port, service type information, and application layer information of the packet 614, and, if an analysis security module suitable for the slicing network is required, determines at least one security function to be executed and priority of the at least one security function to be executed.

In addition, the main security module 604 updates the flag of a corresponding bit of the header information 612 on the basis of the at least one determined security function to be executed to configure the same as a predetermined value.

As shown in FIG. 6, in an embodiment of the present invention, if security functions are required to be executed by the first security module 606_1, the second security module 606_2, the ninth security module 606_9, and the tenth security module 606_10, the main security module 604 updates respective flags of the first bit, the second bit, the ninth bit, and the tenth bit, which are the bits corresponding to the header information 612, to configure the same as a predetermined value.

For example, the first bit, the second bit, the ninth bit, and the tenth bit, which are the bits corresponding to the header information 612, may be configured as "1", respectively.

In addition, the main security module 604 records the priority of the security function to be executed in the packet header information table (312 in FIG. 3) and then transmits the packet header information table 312, in which the priority of the security function is recorded, to the controller 600.

The controller 600 reads the packet information 605 of the packet queue 603 in which the header information 612 is updated, and informs the security module that needs next analysis of the packet queue index of the packet information 605.

In the case where the priority is determined as shown in the packet header information table 312 in FIG. 3, the controller 600 preferentially informs the first security module 606_1 and the ninth security module 606_9 of the packet queue index of the packet information 605, and then informs the second security module 606_2 of the packet queue index of the packet information 605, and finally informs the tenth security module 606_10 of the packet queue index of the packet information 605 such that the respective security modules execute the corresponding security functions.

The first security module 606_1, the ninth security module 606_9, the second security module 606_2, and the tenth security module 606_10 read the packet 614 on the basis of the packet queue index of the packet information 605, execute the corresponding security functions to determining whether to block or pass the packet, if it is determined to block the packet 614, indicate the state of the drop flag 610 as discard, and, if it is determined to pass the packet 614, maintain the state of the drop flag 610, instead of updating the same.

In addition, if the first security module 606_1, the ninth security module 606_9, the second security module 606_2, and the tenth security module 606_10 executing the respective security functions complete the execution of the security functions, they inform the controller 600 of completion of the execution of the security functions.

If all of the security modules executing the security functions determine that the packet 614 is normal, the controller 600 transmits the packet 614 to the slicing service.

However, if at least one of the security modules executing the security functions determines that the packet 614 is abnormal, that is, if the drop flag 610 is determined to be discarded, the controller 600 deletes the packet 614 of which the drop flag 610 is determined to be discarded from the packet queue 603, thereby discarding the packet 614.

Figure 5:
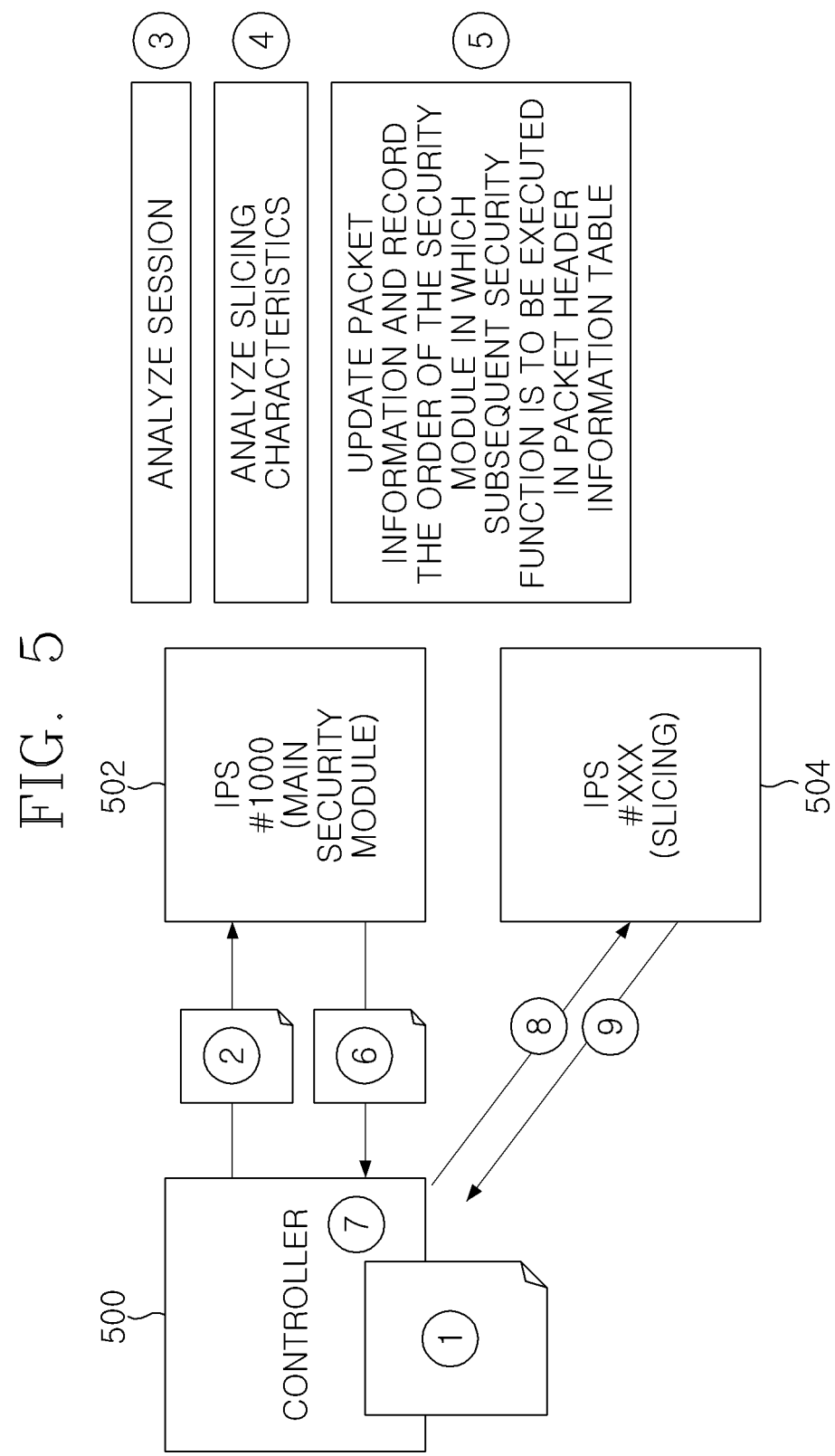
FIG. 5 is a diagram illustrating a method for traffic security processing in a slicing service of mobile edge computing according to an embodiment of the present invention.

FIG. 5 is a diagram illustrating an apparatus and a method for traffic security processing in a slicing service of mobile edge computing according to an embodiment of the present invention.

Referring to FIG. 5, a controller 500 manages a slicing security module list in the MEC (1), and transmits packet information, a packet header information table, and a security module list to a main security module 502 (2).

The main security module 502 may perform an analysis operation to execute a security function suitable for slicing security.

The main security module 502 analyzes basic information of a packet to recognize whether it is a normal session connection (3), checks whether or not the protocol conforms to the slicing network (4), updates the packet information, and records the order of the security module in which a subsequent security function must be executed in the packet header information table (5). The packet analyzed by the main security module 502 tags engine information suitable for the suspicious packet, that is, information of the security module.

The main security module 502 transmits the written packet header information table to the controller 500 (6).

The controller 500 transmits the packet to the security module in which the packet is to be subsequently processed through the packet header information table (7 and 8).

The security module 504 receiving the transmitted packet executes a security function to determine whether to block or pass the packet, and then transmits a determination result thereof to the controller 500 (9).

Finally, the controller 500, based on the determination result received from the security module 504, transmits a normal packet without malicious behavior to the slicing service and, if the malicious behavior is analyzed, remove the corresponding packet to be discarded.

Although the present invention has been described in detail through specific embodiments, these are intended to describe the present invention in detail, and the present invention is not limited thereto, and it will be obvious that any change and improvement can be made by those skilled in the art without departing from the technical idea of the present invention.

All of simple modifications and changes of the present invention fall within the scope of the present invention, and the specific scope of the present invention will become apparent from the appended claims.

What is claimed is:

1. An apparatus for traffic security processing in a slicing service of mobile edge computing, the apparatus comprising:
    a plurality of security modules for analyzing a received packet to respectively execute security functions suitable for slicing security of mobile edge computing;
    a controller for managing a slicing security module list in the mobile edge computing; and
    a main security module for analyzing a received packet on the basis of the slicing security module list to determine a security function to be executed and priority of the security function to be executed,
    wherein the controller transmits the received packet to at least one corresponding security module among the plurality of security modules according to the priority of the security function to be executed, which is determined by the main security module,
    wherein the controller receives a packet through a network interface card, generates a packet header information table and inserts the same to the front of a header of the packet, and transmits the packet header information table, packet information comprising the packet, and the slicing security module list to the main security module, and
    wherein the main security module receives the packet header information table, the packet information comprising the packet, and the slicing security module list from the controller, analyzes the packet to determine the at least one security function to be executed and the priority of the at least one security function to be executed, records the determined priority of the security function in the packet header information table, and then transmits the packet header information table to the controller.

2. The apparatus for traffic security processing in a slicing service of mobile edge computing according to claim 1, wherein when the packet header information table, in which the priority of the security function to be executed is recorded, is received from the main security module, the controller transmits the packet information comprising the packet to at least one security module in which a subsequent security function is to be executed, among the plurality of security modules, on the basis of the received packet header information table, and
    wherein at least one security module receiving the packet information comprising the packet from the controller, among the plurality of security modules, executes a corresponding security function to determine whether to block or pass the packet, and then transmits a determination result thereof to the controller.

3. The apparatus for traffic security processing in a slicing service of mobile edge computing according to claim 2, further comprising a message queue for storing the packet,
    wherein the message queue comprises a packet queue,
    wherein the packet queue comprises packet information comprising a drop flag, header information, and a packet,
    wherein the drop flag indicates whether or not the packet is discarded,
    wherein the header information is comprised of the same number of bits as the number of the plurality of security modules,
    wherein each bit of the header information corresponds to each of the plurality of security modules,
    wherein each bit of the header information indicates whether or not a security module to execute a security function is designated,
    wherein if at least one security function to be executed is determined by the main security module, the main security module indicates designation of a security module to execute the security function in a corresponding bit of the header information, and
    wherein at least one security module receiving the packet information from the controller, among the plurality of security modules, executes a corresponding security function to determine whether to block or pass the packet and, if it is determined to block the packet, indicates the state of the drop flag as being discarded.

4. The apparatus for traffic security processing in a slicing service of mobile edge computing according to claim 3, wherein the controller transmits an index of the packet queue to at least one corresponding security module among the main security module and the plurality of security modules, and
    wherein at least one corresponding security module among the main security module and the plurality of security modules accesses data stored in the packet queue on the basis of the index of the packet queue.

5. The apparatus for traffic security processing in a slicing service of mobile edge computing according to claim 1, wherein if all of the security modules executing the security functions determine that the packet is normal, the controller transmits the packet to a slicing service, and
    wherein if at least one of the security modules executing the security functions determines that the packet is abnormal, the controller discards the packet.

6. The apparatus for traffic security processing in a slicing service of mobile edge computing according to claim 1, wherein the security modules comprise a container-based modular intrusion prevention system (IPS).

7. The apparatus for traffic security processing in a slicing service of mobile edge computing according to claim 1, wherein if the main security module determines that the packet is normal as a result of analyzing the received packet, the controller transmits the packet to a slicing service.

8. The apparatus for traffic security processing in a slicing service of mobile edge computing according to claim 1, wherein the main security module determines the security function to be executed and the priority of the security function to be executed on the basis of at least one piece of protocol information, session information, IP address information comprising a source IP address and a destination IP address, service port information comprising a destination port, service type information, and application layer information of the packet.

9. A method for traffic security processing in a slicing service of mobile edge computing, the method comprising the operations:
    (A) in which a controller for managing a slicing security module list in the mobile edge computing transmits the slicing security module list and a received packet to a main security module;
    (B) in which the main security module analyzes the packet received from the controller to determine a security function to be executed and priority of the security function to be executed; and
    (C) in which the controller transmits the packet to at least one corresponding security module among the plurality of security modules according to the priority of the security function to be executed, which is determined by the main security module,
    wherein, in the operation (A), the controller generates a packet header information table and inserts the same to the front of a header of the packet, and transmits the packet header information table, packet information comprising the packet, and the slicing security module list to the main security module, and
    wherein, in the operation (B), the main security module receives the packet header information table, the packet information comprising the packet, and the slicing security module list from the controller, analyzes the packet to determine the at least one security function to be executed and the priority of the at least one security function to be executed, records the determined priority of the security function in the packet header information table, and then transmits the packet header information table to the controller.

10. The method for traffic security processing in a slicing service of mobile edge computing according to claim 9, wherein, in the operation (C), when the packet header information table, in which the priority of the security function to be executed is recorded, is received from the main security module, the controller transmits the packet to at least one security module in which a subsequent security function is to be executed, among the plurality of security modules, on the basis of the received packet header information table,
    further comprising an operation (D), after the operation (c), in which at least one security module receiving the packet information comprising the packet from the controller, among the plurality of security modules, executes a corresponding security function to determine whether to block or pass the packet by, and then transmits a determination result thereof to the controller.

11. The method for traffic security processing in a slicing service of mobile edge computing according to claim 10, wherein the controller stores the packet in a message queue,
    wherein the message queue comprises a packet queue,
    wherein the packet queue comprises packet information comprising a drop flag, header information, and a packet,
    wherein the drop flag indicates whether or not the packet is discarded,
    wherein the header information is comprised of the same number of bits as the number of the plurality of security modules,
    wherein each bit of the header information corresponds to each of the plurality of security modules,
    wherein each bit of the header information indicates whether or not a security module to execute a security function is designated,
    wherein if at least one security function to be executed is determined by the main security module, the main security module indicates designation of a security module to execute the security function in a corresponding bit of the header information, and
    wherein at least one security module receiving the packet information from the controller, among the plurality of security modules, executes a corresponding security function to determine whether to block or pass the packet and, if it is determined to block the packet, indicates the state of the drop flag as being discarded.

12. The method for traffic security processing in a slicing service of mobile edge computing according to claim 11, wherein the controller transmits an index of the packet queue to at least one corresponding security module among the main security module and the plurality of security modules, and
    wherein at least one corresponding security module among the main security module and the plurality of security modules accesses data stored in the packet queue on the basis of the index of the packet queue.

13. The method for traffic security processing in a slicing service of mobile edge computing according to claim 9, further comprising an operation (E), after the operation (D), in which if all of the security modules executing the security functions determine that the packet is normal, the controller transmits the packet to a slicing service, and in which if at least one of the security modules executing the security functions determines that the packet is abnormal, the controller discards the packet.

14. The method for traffic security processing in a slicing service of mobile edge computing according to claim 9, wherein the security modules comprise a container-based modular intrusion prevention system (IPS).

15. The method for traffic security processing in a slicing service of mobile edge computing according to claim 9, wherein if the main security module determines that the packet is normal as a result of analyzing the received packet, the controller transmits the packet to a slicing service.

16. The method for traffic security processing in a slicing service of mobile edge computing according to claim 9, wherein the main security module determines the security function to be executed and the priority of the security function to be executed on the basis of at least one piece of protocol information, session information, IP address information comprising a source IP address and a destination IP address, service port information comprising a destination port, service type information, and application layer information of the packet.

\* \* \* \* \*